O. ASHTON.
PULLING-OVER AND LASTING MACHINE.
APPLICATION FILED JAN. 21, 1914.

1,280,613.

Patented Oct. 1, 1918.
6 SHEETS—SHEET 2.

WITNESSES

INVENTOR.

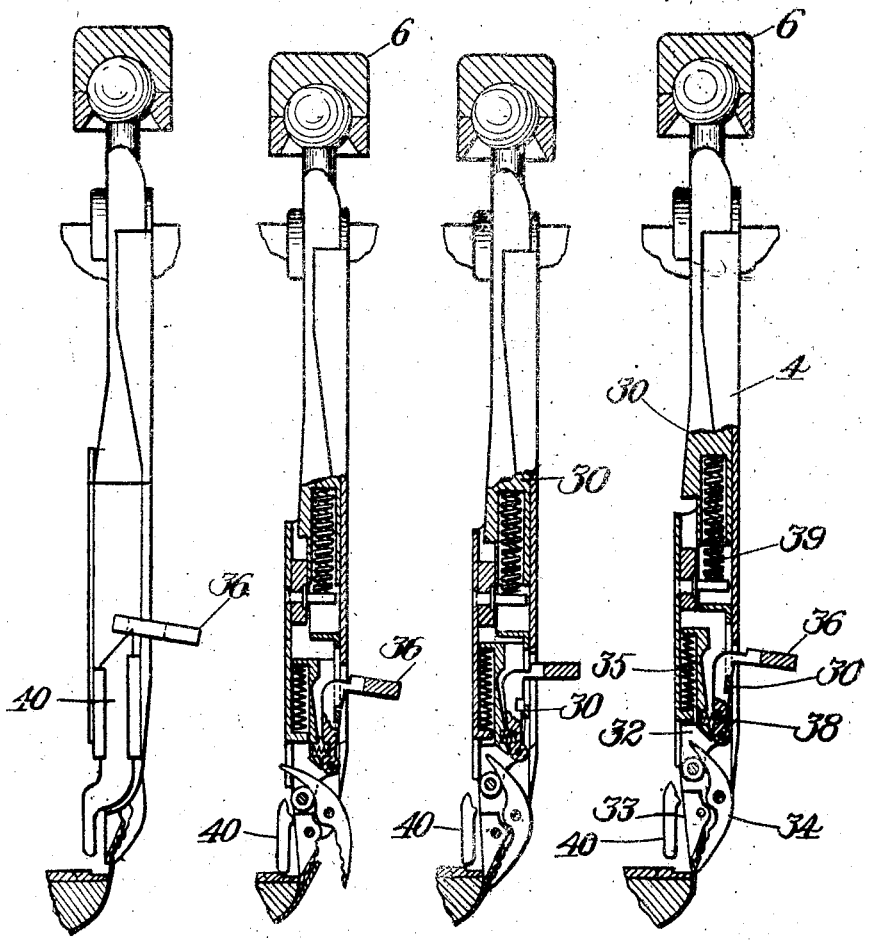
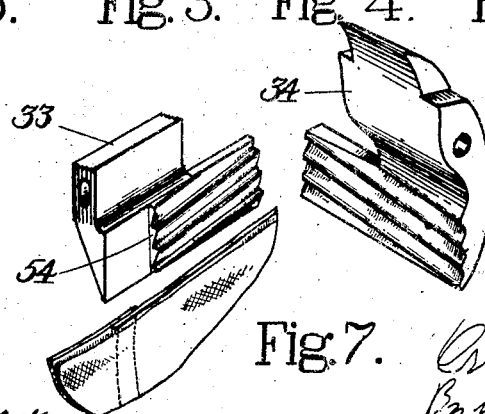
Fig. 6.  Fig. 3.  Fig. 4.  Fig. 5.
Fig. 7.

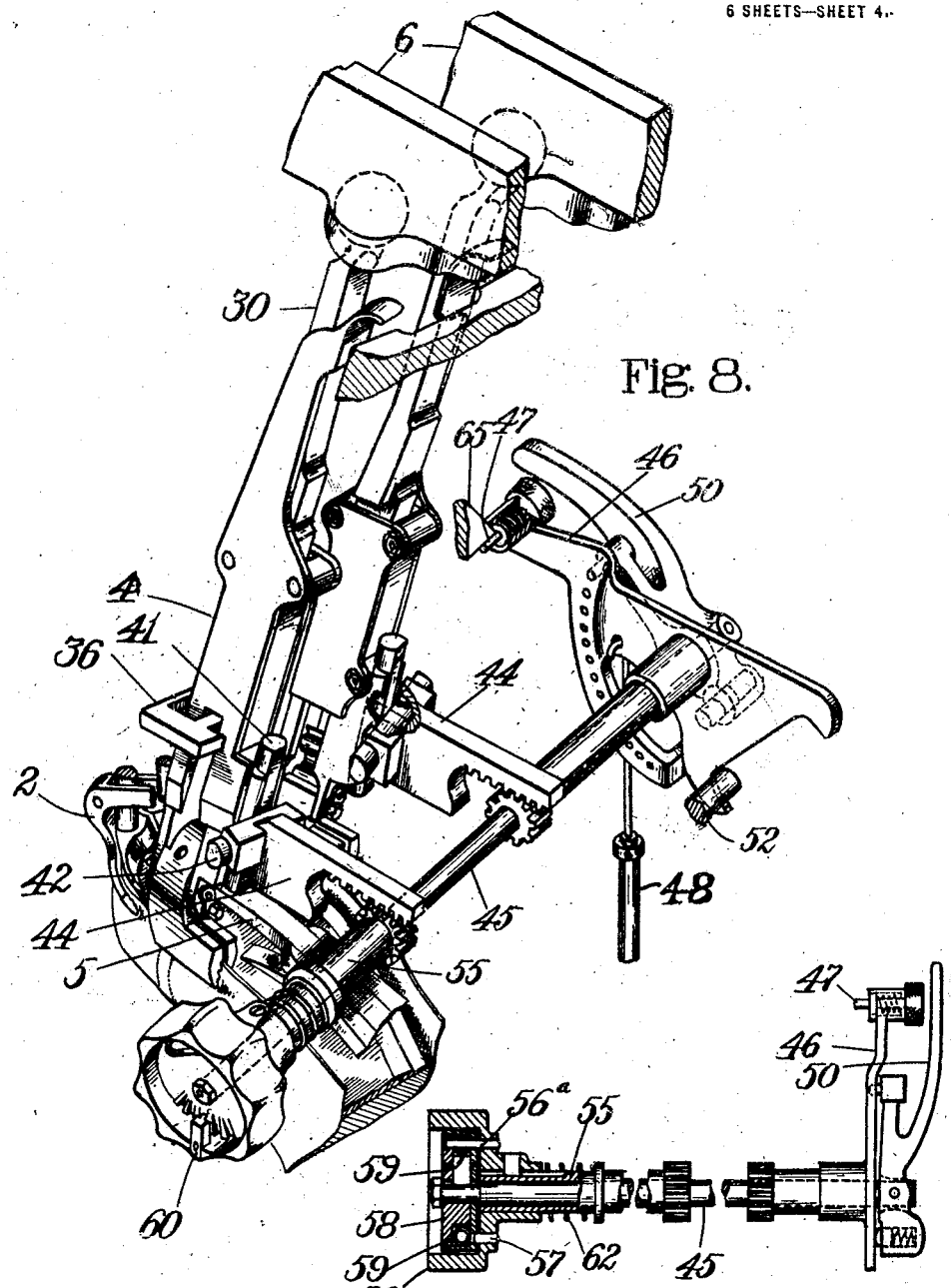

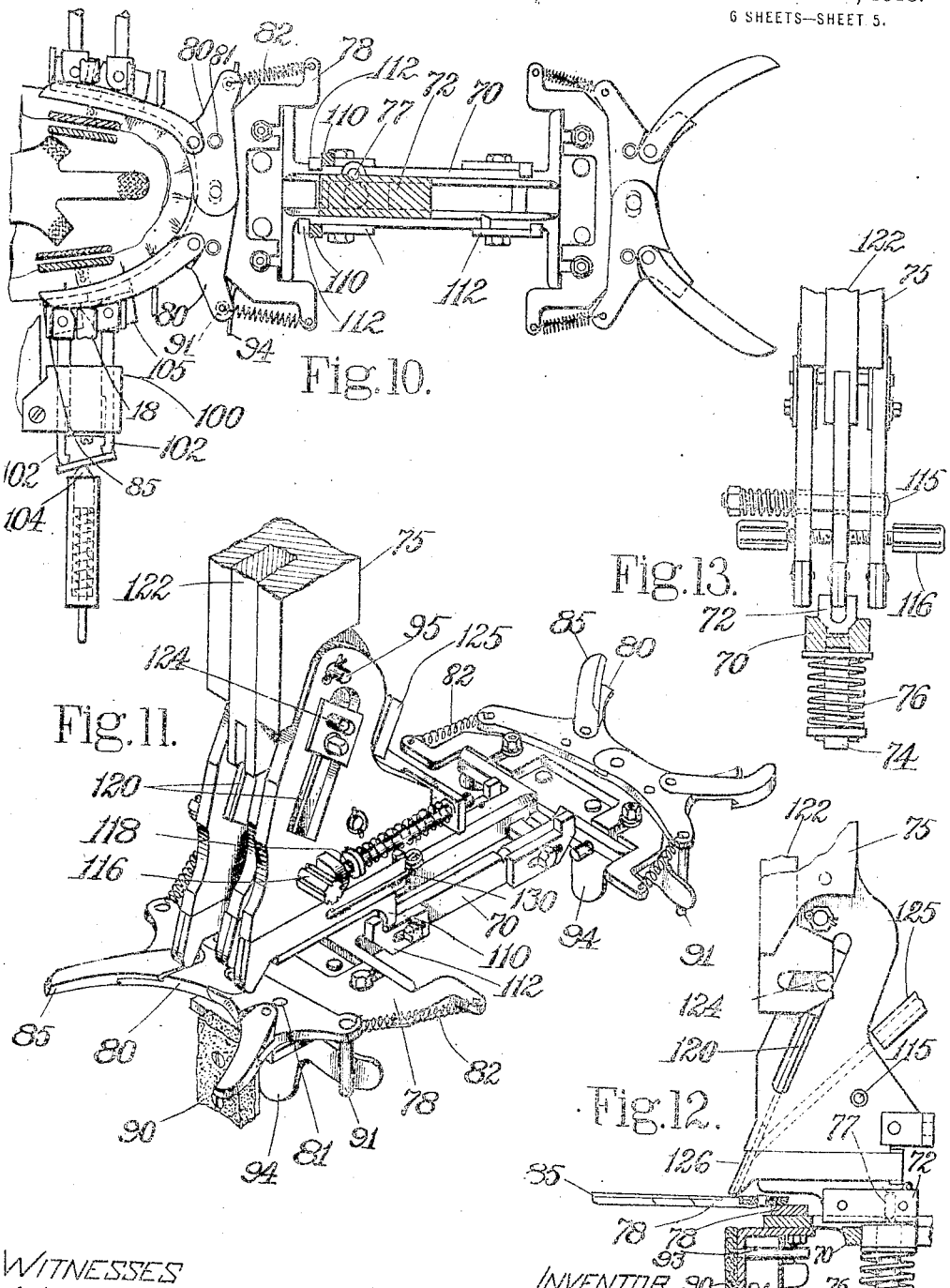

UNITED STATES PATENT OFFICE.

ORRELL ASHTON, OF SWAMPSCOTT, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

PULLING-OVER AND LASTING MACHINE.

1,280,618.

Specification of Letters Patent.

Patented Oct. 1, 1918.

Application filed January 21, 1914. Serial No. 813,571.

*To all whom it may concern:*

Be it known that I, ORRELL ASHTON, a citizen of the United States, residing at Swampscott, in the county of Essex and State of Massachusetts, have invented certain Improvements in Pulling-Over and Lasting Machines, of which the following description, in connection with the accompanying drawings, is a specification, like reference characters on the drawings indicating like parts in the several figures.

This invention relates to shoe machinery and particularly to pulling-over, lasting and fastening machinery. The general object of this invention is to perfect the machine disclosed in United States Letters Patent No. 1,137,564, granted upon my prior application on April 27, 1915.

One of the features of this invention which is of great importance relates to means for effecting gripping engagement with the work and for positioning the work correctly upon the last. Novel characteristics of this feature are found in means for closing a gripper or grippers independently of their normal operation and preferably independently of the power operating mechanism, the construction herein shown being adapted for closing the side grippers with such force only as will permit their adjustment along the edge of the upper; in means for effecting movement of the side grippers lengthwise of the last, as for adjusting the upper or for drafting the upper forwardly; in provision for detecting contact of the grippers with the tip seam during a forward movement of the grippers along the edge of the upper, and preferably for thereafter forcing forwardly the engaged portion of the tip seam whereby the two ends of the tip seam may be brought into uniform or other desired angular relation to the length of the last; in means for maintaining the adjustment of the upper while it is being pulled and preferably for releasing the retaining means and for retracting the grippers to starting position automatically; and in means whereby a relative adjustment of the side grippers lengthwise of the last may be effected.

Another important feature of this invention relates to improved mechanism for lasting the upper into position to be secured to the sole or innersole upon the shoe bottom. Novel characteristics of this feature of the invention, among others, are found in provision for lasting different toes, such as rights and lefts; in provision for extending the lasting back uninterruptedly along the sides of the forepart of the shoe to and, it may be, beyond the usual location of the side pulling-over tacks; in means for relating the lasting wipers to side tackers so that the former are operated by the latter; and in a novel construction of wiper mechanism for the purposes in view.

Still another valuable feature in the development of this invention relates to the provision for improved fastening of the upper before it escapes from control of the pulling-over and lasting instrumentalities. Novel characteristics of this feature are found in a novel combination of over-working and fastening mechanisms organized to cause a plurality of tacks to be driven each at the same or a desired distance from the adjacent portion of the last edge; in a right and left adjustment of the toe tackers for right and left toes; in an arrangement for distancing the tacks apart; and in certain features of the construction of the tackers for serving the intended purposes in the described machine.

These and other features of this invention, including certain details of construction and more important combinations of parts, will appear in connection with the following description of the preferred embodiment of the invention shown in the accompanying drawings. Certain features of novelty herein shown which are concerned with tacking mechanism *per se* are claimed in divisional application, Ser. No. 78,522.

Figs. 3, 4 and 5 show, partly in section, one of the side gripper mechanisms in three stages of the operation of said mechanism, and Fig. 6 is a front view of the gripper as shown in Fig. 5.

Fig. 7 is a perspective view of the gripper jaws and a portion of the shoe stock with which the jaws are intended to engage.

Fig. 8 is a perspective view of the side gripper mechanisms as seen from the rear.

Fig. 9 is a view, partly in plan and partly in section, of the side gripper adjusting mechanism.

Fig. 10 is a plan view of the lasting mechanism, the toe tacker arm which supports said mechanism being shown in section.

Fig. 11 is a perspective view showing also the toe tackers.

Fig. 12 is a side elevation, partly in section, of the toe tackers and toe lasting mechanism.

Fig. 13 is a front elevation of the toe tackers showing the wiper supporting plate in section.

The general organization of the machine is similar to that of the machine described in said prior patent, the machine being here shown as adapted for pulling-over, lasting and tacking turn shoes, and for this purpose the machine comprises, broadly speaking, toe and side grippers for seizing, adjusting and stretching the upper; sole and heel rests for positioning and supporting the last; side clamps for engaging under the forepart of the last and upholding it for the lasting and tack inserting operations; lasting wipers for gathering the upper, wiping it over the sole upon the last bottom and holding it in position to be fastened; and tacking mechanisms arranged for inserting eleven tacks by which the toe and forepart portions of a turn shoe are fastened in lasted position ready for presentation of the shoe to a turn sewing machine which shall stitch the upper to the sole. Reference may be made to said prior patent for description of those parts of the machine which it appears unnecessary to describe in this specification in connection with the improvements here disclosed.

Figure 1:
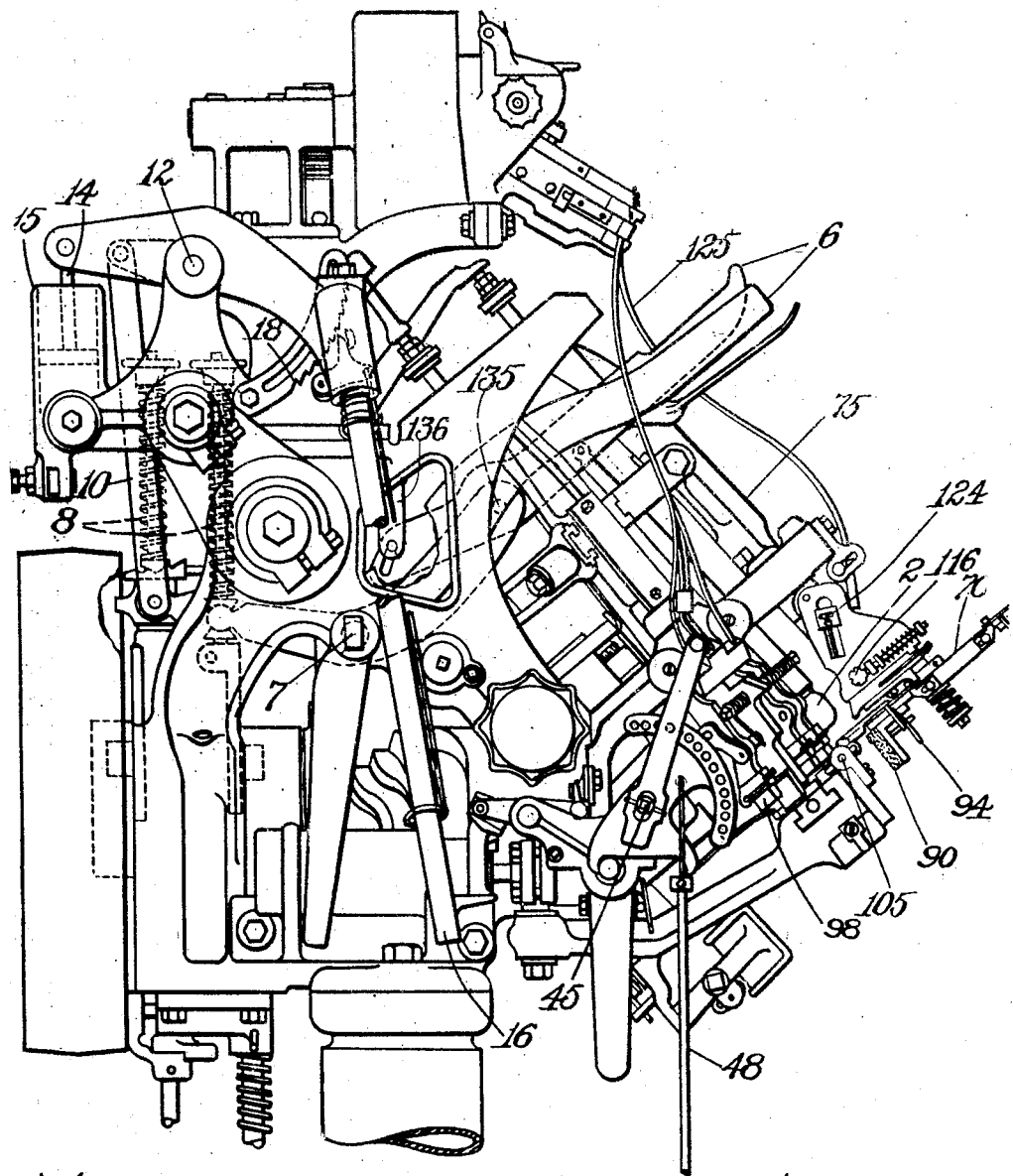
Figure 1 is a side elevation of a pulling-over and lasting machine equipped with the present invention.
Figure 2:
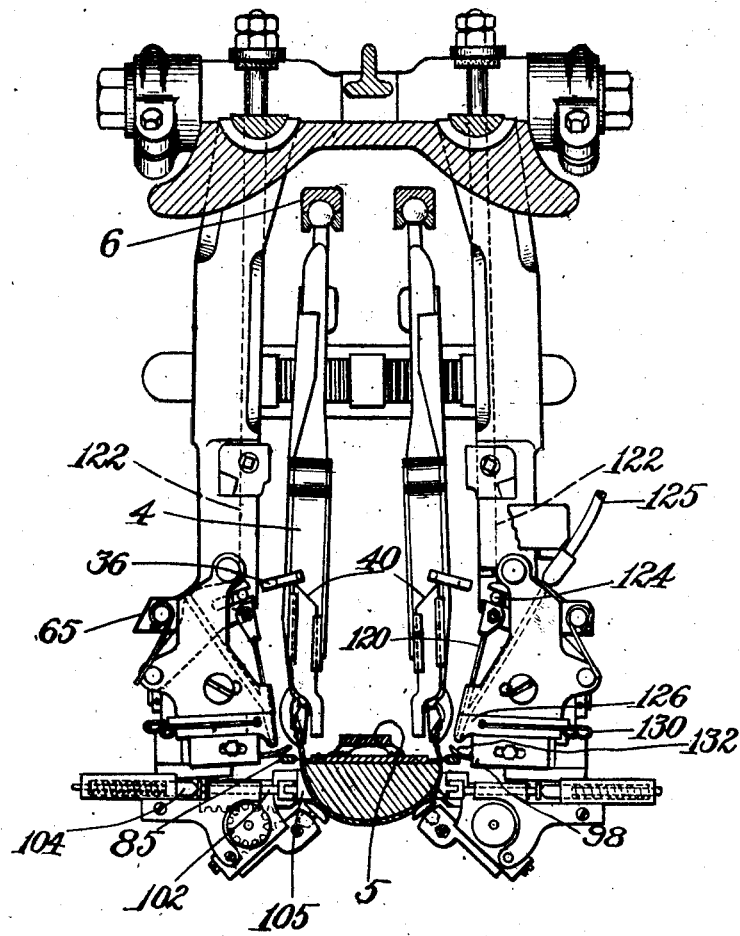
Fig. 2 shows the side gripper and the side tacker mechanisms in front elevation, some of the parts being shown on a vertical transverse section located in the rear of the toe gripper and toe tacker.

The toe gripper is indicated at 2 and the side grippers at 4 (Fig. 2). The sole rest 5 is located between the grippers and determines the altitude at which the shoe shall be presented and also holds the last against the upward pull of the grippers effected by their operating levers 6 which are fulcrumed at 7 and the rear ends of which are connected yieldingly through springs 8 with operating cams on the main shaft. The rear ends of the side gripper levers are connected by links 10 with one arm of a rock-shaft 12 which has another arm connected to a piston 14 movable within a fluid containing chamber 15. This combination operates to retard the pulling movement effected by the side grippers and to cushion the movement of the side gripper levers. The rock shaft 12 has a forwardly extending arm provided with a pawl and with a hand lever or handle 16 which constitutes a downwardly and forwardly directed extension of the rock shaft arm and is located within convenient reach of the operator. This pawl is adapted to be moved by a sliding rod (Fig. 1) located on the hand lever into engagement with a fixed ratchet 18 for arresting the pulling movement of the side grippers at the will of the operator. The slow pulling movement insured by the controller 14, 15 gives opportunity for the workman to watch the progress of the upper stretching operation and to arrest it when the shoe upper has been pulled sufficiently.

The side grippers contain many of the features of construction disclosed in United States Letters Patent No. 1,030,264, granted June 18, 1912, upon the application of Ronald F. McFeely, including the operating bar 30, the closing slide 32, the jaw 33 fixed to the gripper casing, the jaw 34 pivoted to the gripper casing and having a tail piece engaged by the closing slide 32, the gripping being effected by the upward movement of the closing slide which operates to turn the pivoted jaw 34. When said jaw can turn no farther, upward movement of the slide 32 lifts the jaw 34 and with it the other jaw and the gripper casing for effecting the upper stretching pull. The gripper jaws are opened by a downward movement of the operating bar 30 relatively to the casing the descent of which is arrested by the engagement of ears, located upon its upper ends, with the frame of the machine.

There is a spring 35 located between an inwardly projecting ledge of the gripper casing and an overlying ledge of the closing slide in position to be compressed when the jaws are forced open as in Fig. 3. Movement is transmitted from the operating bar 30 to the closing slide 32, downwardly for opening the gripper jaws and again upwardly for securely closing them, through a latch 36 which is pivoted at its lower end to the slide and has a notch in its right hand face, Fig. 3, for engagement with a downwardly projecting portion of the operating bar. A spring 38 presses the latch in the direction for engaging the operating bar.

Each side gripper has formed in its front face, Figs. 2 and 6, a guideway for a vertically movable feeler 40 arranged to be engaged with the sole of the shoe as the shoe is presented against the sole rest. By this engagement the feelers are raised, either one at a time or together, and their upper beveled ends are caused to enter the recesses in the latches 36 and rock the latches in the direction to disengage them from the operating bars 30. When this disengagement occurs the springs 35 expand and raise the closing slides 32 far enough to close the side grippers lightly upon the upper which has been positioned between the jaws in presenting the shoe to the sole rest.

This organization provides for closing the side grippers as an incident to presentation of the shoe in position to be operated upon, the construction also affording provision for the tripping of the latches 36 directly by hand if the operator so desires. This closing of the side grippers is effected independently of the power operating mechanism by which they are later operated and may be made to take place on one side of the shoe at a time, giving opportunity for the workman to arrange the upper in the jaws at the second side of the shoe after the upper has been gripped at the first side.

In an embodiment of the described combination which I have found it advantageous to use the initial closing of the gripper jaws is effected by a light spring and the grip is insufficient to hold the jaws and the upper from slipping. When, however, the power mechanism is started and the gripper levers 6 are moved the operating bars rise and reëngage the notches in the latches 36, as shown in Fig. 5, after which the closing slides 32 are elevated for tightening the grip on the stock. The springs 39 are arranged and operate as described in the above-mentioned Patent No. 1,030,264 to hold the gripper casings and the jaws from rising until the jaws have been tightly closed upon the upper. The latches 36, it will be understood, are finally engaged and tripped in the usual manner by the tacking instrumentalities to cause the grippers to release the upper stock.

Each of the side grippers is provided on its rear edge with a slideway in which is confined a block 41, Fig. 8, and to the block is pivoted a transverse block 42 confined in a guideway on the front end of a rack bar 44, these connections permitting the up and down movement of the side grippers on the vertically stationary blocks 41 and the in and out movement of the grippers with relation to the rack bars 44. Rack teeth are located on the lower side of each of the rack bars and engage pinions on a rock shaft 45 which extends transversely of the machine and can be turned in stationary bearings in the machine head whereby the side grippers on the two sides of the shoe can be moved together in the same direction toward or from the toe of the shoe. The rock shaft 45 carries at one end an arm or plate 46 from which extends an operating rod 48 to a treadle not shown. The plate 46 is not fastened to the rock shaft but is adjustably connected with it by a latch device 50 carrying a stud adapted to engage in one or another of a series of holes in the plate. The latch device is secured to the rock shaft by a transverse pin which allows it to rock against the resistance of a spring plunger for engaging and disengaging the pin with the holes in the plate. The plate has one or, it may be, two stops on its rear end for engagement with a fixed pin 52 to limit the turning movement which may be imparted to the plate.

The described organization provides that, after the grippers have been lightly closed upon the upper before the power mechanism has started and it may be as an incident to the presentation of the shoe, the said side grippers may, by the depression of the treadle, be moved together forwardly toward the toe of the shoe, and that the position to which the grippers may be so moved can be predetermined by the stop 52 and the adjustment between the plate 46 and the latch device 50.

This machine, like other pulling-over machines of this type, is further organized so that the toe gripper 2 serves as an abutment against which the toe end of the last is positioned for locating the last longitudinally in the machine prior to the closing of the grippers upon the upper. The above-described mechanism therefore provides for a forward movement of the side grippers to a predetermined distance from the toe end of the last, the limit of the forward movement being adjustable for shoes of different styles and sizes by the connection between the plate 46 and latch device 50. The light force with which the side grippers are closed upon the upper enables the grippers to slide along the upper at the two sides of the shoe during the forward movement of the grippers. Each side gripper is provided with a stop face adapted to arrest the sliding movement of the jaws along the upper when the increased thickness of the upper stock at the tip seam is encountered. As shown in Fig. 7, the stop face is provided at 54 by cutting away a portion of the inner jaw, thus enabling the jaws to slide far enough forwardly so that in the subsequent tight holding of the jaws they will grasp and be prepared to pull the upper at the tip seam. The jaws have ribs inclined backwardly and upwardly, Fig. 7, to overcome any tendency of the upper to escape from between them as the jaws slide forwardly along the upper toward the tip seam. It will be apparent that if either end of the tip seam is farther back than the other end, it will be engaged and pushed forward by the stop face 54 of the gripper on that side of the shoe until the seam is straightened, that is, until the other gripper comes into engagement with the seam at the opposite side of the shoe. Furthermore, both ends of the tip seam will be forced forwardly until the tip seam is located at the distance from the end of the toe which has been predetermined by the adjustment of the parts 46, 50. This mechanism therefore provides for straightening a crooked tip seam and for locating the tip seam to give the length of tip required for the style and size of the shoe being operated upon. The side grippers and the toe grippers sustain the shoe so that the operator is enabled to grasp and hold the edge of the upper in the rear of the side grippers while the side grippers are being moved forwardly to fix the location of the tip seam. This manual assistance is not essential, but operators appear to consider that the best results are assured by it.

As I am advised, the system herein disclosed of locating the tip seam of a shoe is broadly new and I intend the annexed claims to afford protection commensurate with the breadth of the invention.

Not all styles of shoes require the ends of the tip seam to be located at the same distance from the end of the last on the inner and the outer sides of the shoe but instead the shoe is sometimes so designed that the end of the tip seam at the outer side of the shoe shall be located farther back or farther forward than the other end. To adapt the described mechanism for producing this location of the tip seam the pinion coöperating with the left hand rack 44, Fig. 8, is formed on a sleeve shaft 55 which can be adjusted on the rock-shaft 45 for positioning the coöperating gripper forwardly or backwardly with relation to the gripper on the other side of the shoe. One adjustment of the gripper will adapt it for locating the tip seam and pulling over a right shoe of a given style and a reverse adjustment will adapt it for locating the tip seam and pulling over a left shoe of that style. The sleeve shaft 55 has splined upon its outer end a hand wheel 56 which can be rotated for turning the sleeve shaft 55 and effecting the adjustment of the gripper forwardly or backwardly. The hand wheel 56 has a pin 56$^a$ projecting into a curved slot in the head 58 of the shaft 45. Return springs 59 are located in the head 58 on opposite sides of the pin 56$^a$ and by their action upon the pin serve to determine a normal position of the sleeve 55 with reference to the shaft 45. When the sleeve 55 is in such normal position a pin 57 projecting from the back of the hand wheel enters a hole in the head 58 and locks the sleeve to the shaft 45, the parts being held in this relation by means of a spring 62 which operates to press the hand wheel forwardly toward the head 58. The hand wheel is also provided with a locking finger 60 which can be made to engage teeth on the head 58 when the hand wheel is sufficiently displaced axially in opposition to the spring 62. Locking engagement of the finger 60 with these teeth, when the hand wheel has been turned in one direction or the other relatively to the shaft 45, will be maintained through the reaction of the stressed upper while the adjusted gripper is holding the upper under tension, and the finger will be forced out of engagement with the teeth upon movement of the hand wheel by the action of the spring 62 when the grippers release the upper, thereby permitting the springs 59 to effect such rotation of the sleeve 55 as to restore the connected side gripper to its normal position from which it can be moved either forwardly or backwardly for the right or left shoe presented at the next operation of the machine.

The plate 46 carries a spring pin 47 which is adapted to slide down the inclined face of a locking device 65 and catch under the locking device for holding the side grippers in the position to which they have been advanced for locating the tip seam. This permits the operator to remove his foot from the treadle attached to rod 48. The stop device 65 is herein shown as carried by one of the side tacker arms which, when it swings inwardly over the shoe for delivering tacks, will withdraw from over the locking pin and free the gripper advancing mechanism so that it can be returned to its starting position by a spring associated with its treadle operating mechanism.

The present machine is organized, like the machine described in said prior application, to seize tightly the upper and pull it by all of the grippers when power is applied and then come to rest for inspection and adjustment of the work; also to advance the side clamps when the machine is restarted and to come to rest with the shoe held by the side clamps, the grippers and the heel rest. If the upper is short the toe grippers may be in the way of properly positioning the toe wiping mechanism and in that case it is found in practice that the toe grippers may be manually released to give place to the toe wiping mechanism without any objectionable slackening of the upper which continues to be held by the side grippers and the side clamps. The wiping mechanism is shown in side elevation in Fig. 1 and in detail in Figs. 10, 11, 12 and 13.

For performing the lasting operation on right and left shoes the toes of which are unsymmetrical, duplex wiping mechanism is employed, one mechanism being adapted for lasting the toes of the left shoes and the other mechanism for lasting the toes of the right shoes. These mechanisms are alike except in the respects hereinafter mentioned, and therefore only one of them will be described in detail.

A wiper supporting bar 70, Figs. 10 and 13, has a groove to fit the lower edge of a block 72 which is secured to the lower end of the front tacker arm 75. A slot in the groove in bar 70 receives a stem 74 depending from the block and carrying a spring 76 which upholds the bar 70 and the wiper mechanisms but permits said bar to be adjusted lengthwise of the block 72 toward and from the shoe and also to be pulled downwardly in opposition to the spring 76 to disengage its groove from the rib on the block 72 after which the bar 70 can be rotated on the stem 74 through 180° to bring the right or the left toe wiper mechanism alternatively into operative position. The bar has a recess, Figs. 11 and 12, and the block 72 carries a coöperating spring pin 77 to insure the outward movement of the wiper mechanism by the tacker arm 75, as will be explained.

The bar 70 has on each end a cross-head affording support for a plate 78 to which toe wiper plates 80 are connected by separate pivots 81 located on opposite sides of the center of the wiper mechanism and therefore on opposite sides of the middle of the toe, as appears clearly in Fig. 10. The two wiper plates 80 are connected together by a pin and slot connection at the center of the toe and the plates have outwardly projecting arms which are connected by springs 82 with lateral extensions of the plates 78, said springs operating to advance the connected middle ends of the wiper plates 80 but permit said plates to yield and adapt themselves to the curvature of the toe of the shoe which is presented to them. Side wiper plates 85 are pivoted at their front ends to the plates 80 and are formed and arranged to extend backwardly along the sides of the toe and forepart of the last and preferably to or beyond the tip seam and the usual location of the side pulling over tacks, as shown in Fig. 10.

The bar 70 adjustably supports a depending plate 90 the rear face of which may be cushioned for engagement with the toe end of the shoe when the toe lasting mechanism is advanced to its operative position. This advance is made by the operator while the machine is at rest and is effected by tipping the bar 70 upon the block 72 sufficiently to disengage the bar from the locking pin 77. The operator is permitted to position the wipers vertically by tipping them relatively to the block 72 against the resistance of spring 76. A finger piece 94 is guided on a stud 93 projecting from the abutment 90 and at its opposite ends engages pins 91 depending from the outer ends of the toe wiper plates 80. By engaging this plate 94 the operator raises the wipers to a position just above the plane of the sole in a turn shoe and then, by pressing forwardly on the plate 94, causes the wiper plates 80 to adapt themselves to the curvature of the toe. Preferably the operator presses sufficiently upon the plate 94 to turn the wiper plates 80 about the pivots 81 and cause them to press the upper over the corners of the toe. In this movement of the wiper plates 80 they back away from the middle of the toe. The effect of lasting over the corners of the toe first is to throw some of the fullness of upper material toward the middle of the toe and thereby distribute the fullness in a way to prevent the formation of wrinkles at the corners of the toe. In the illustrated machine the wiping over at the middle of the toe occurs when the power mechanism is started. In practice the operator maintains his finger against the plate 94 while he treadles the machine and as the tacker arm 75 advances the block 72 is moved along the slot in the bar 70 until it engages the end of the slot whereupon it forces the toe wiper mechanism inwardly over the shoe bottom.

The extent to which the wiper plates 80 are pulled open by the springs 82 is limited by the engagement of the pins 91 with the plate 78 and preferably, and as here shown, the pivot pins 81 extend through holes in plate 78 which are larger than the stems of the pivot pins so that there is capacity for movement of the wipers relatively to the plate 78 in any direction in a horizontal plane for adjusting themselves within limits to variations in shapes of toes. The side wiper plates 85 are set into recesses in the top faces of the plates 80 the walls of which recesses limit the independent swinging movement of the plates 85 and insure that said plates will be carried with plates 80 approximately to working relation to the shoe. It will be understood that this occurs while the machine is at rest before the side tacker mechanisms are advanced over the shoe bottom.

Each of the side tacker mechanisms, as herein shown, comprises four tackers the first, second and fourth of which, counting from the front of the machine, are pivoted at 95 to the tacker arm 75 while the third tacker 96 is rigid with said arm. Each of the tackers is equipped with an adjustable abutment piece 98 for determining the extent to which the tackers shall advance over the shoe bottom. These abutment pieces are arranged to engage the outer edge of the side wiper plates 85 and move said plates over the shoe bottom to do their work. The wiper plates 85 are therefore made narrow so that after they have been moved by the abutment pieces until the latter have engaged the side of the shoe the tacks may be inserted at the inner edges of the plates and into the relatively thick between-substance just inside the feather edge of a turn shoe sole.

For the purpose of better holding the upper smooth against the edge of the last for the operation of the wipers 85 the side clamps described in my prior patent are herein improved by the addition of clamping fingers arranged to engage the side face of the shoe in front of the usual location of the side clamps. Each side clamp arm has a forward extension 100 in which are supported slides 102 yieldingly pressed toward the shoe by a spring pin 104 acting through an equalizing plate. Each slide carries on its inner end a pivoted clamping finger 105, the fingers being formed and arranged to present a substantially continuous acting edge for engagement with the upper immediately below the shoe bottom. These supplemental clamping fingers coöperate with the wiper plates 85 to produce smooth lasting of the portion of the shoe acted upon by them.

It has been explained that the toe tacker mechanism, as it advances to position for inserting the tacks, operates the toe wiper mechanism by engagement with the end face of the slot in the bar 70 and that the side tacker mechanisms actuate the side wiper plates 85 by engagement of the abutment pieces 98 with the edge of the side wiper plates. It will be understood that it is chiefly the abutment piece on the tacker 96 that operates the side wiper plate because the pivotal connection of the first, second and fourth tackers permits them to yield backwardly and adapt their positions to the shape of the edge of the wiper or of the edge of the shoe. By this arrangement each of the side tackers is caused to locate its tack at substantially the same distance inwardly from the edge of the last whatever the shape of the last, the wipers, of course, being changed for widely different variations in shapes of toes. A similar arrangement exists in the toe tacker mechanism, the middle tacker, Fig. 12, being unyieldingly connected to the tacker arm 75 and the tackers at either side of the middle being pivotally connected to said arm and provided with abutment pieces 110, Fig. 11, adapted to contact with stops 112 adjustably attached to the wiper supporting bar 70. For right and left toes the stops 112 are adjusted as shown in Fig. 10, one in advance of the other, to cause the tackers controlled by them to locate the tacks at the same distance from the edge of an unsymmetrical toe. The adjustment of the stops 112 associated with the wiper mechanism for a left shoe will of course be a reverse of the adjustment of the stops on the other end of the bar 70, Fig. 10, which are associated with the wiper mechanism for the right shoe.

Figure 14:
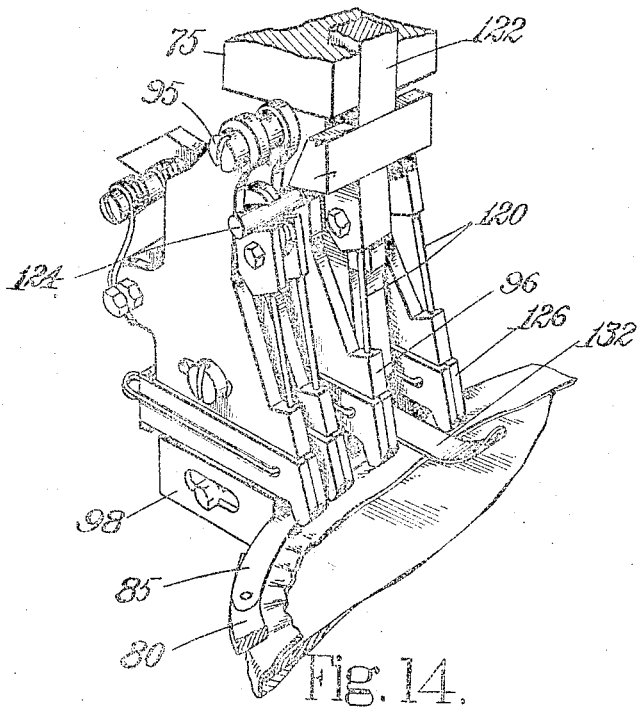
Fig. 14 is a perspective view showing the side wipers and the side tackers in operative relation to the shoe.
Figure 15:
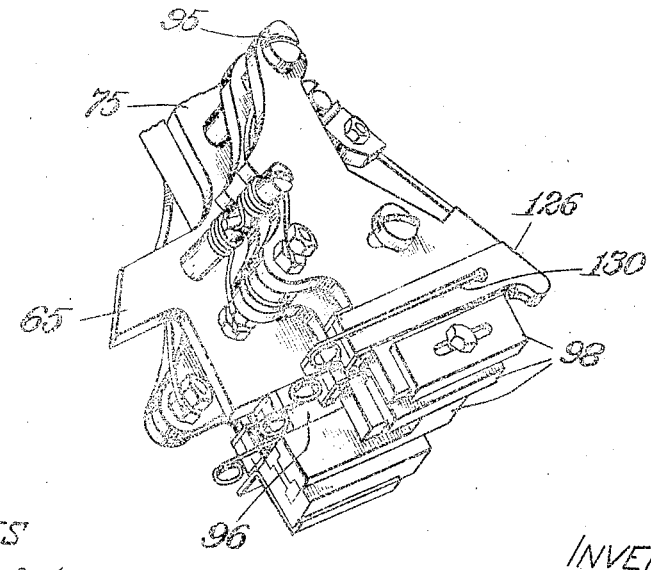
Fig. 15 is a perspective view of the side tacker mechanism from the rear.

For wide and narrow toes the wipers are changed as above stated and it is also desirable to change the lateral spacing of the toe tacks for such shoes, and provision is herein made for such compensating adjustment of the toe tackers by mounting the pivoted tackers so that they can be spread apart or alternatively adjusted toward the middle tacker, see Fig. 12. To this end a connecting rod 115 extends from one outside tacker loosely through the middle tacker, and through the other outside tacker and carries a spring which acts to press the outside tackers toward the middle tacker. The spacing of the outside tackers from the middle tacker is then adjusted by screws 116 having knurled heads as shown in Figs. 13 and 14. The outside tackers are held yieldingly pressed forwardly by spring actuated rods 118, Fig. 11, said rods being supported in suitable guides projecting laterally from the outside tackers. As here shown, each rod has a collar fixed upon it against which the spring acts to press it forwardly and the end of the rod is arranged to abut against the knurled head of the adjusting screw 116 thereby restraining the adjusting screw from undesired rotation. In the side tacker mechanisms the pivoted tackers are each pressed forwardly by its own spring as shown clearly in Figs. 14 and 15. Each of the three toe tackers has an independent driver rod 120, the rods in the outside tackers being, of course, adjustable with said tackers toward and from the middle tacker. The driver bar 122 is forked at its lower end, Figs. 11 and 13, and extended outwardly or backwardly into the spaces between the outside tackers and the middle tacker, the extensions being provided with horizontal slots for engagement with a transverse rod 124 which extends through the heads of the several driver rods. By this arrangement all of the driver rods will be operated together by the driver bar whatever may be the spread of the toe tackers.

Figure 16:
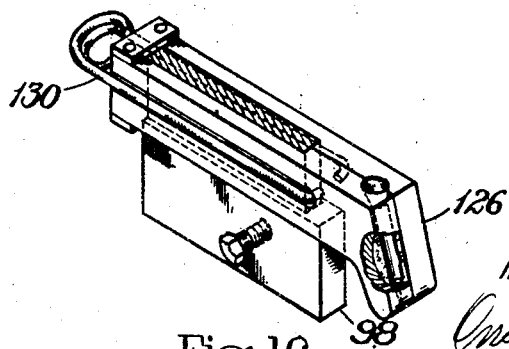
Fig. 16 is a perspective view of one tack holder separated from the others.

Tacks are delivered by the usual tack conductors 125, Fig. 12, the tacks passing through a channel formed for the purpose in the tackers and being delivered therefrom into tack holders 126 which are substantially alike for each of the toe and side tackers. These tack holders comprise parallel and closely adjacent horizontal plates pivotally mounted at their rear ends and pressed together by a spring 130, Figs. 11, 14, 15 and 16, the plates being formed at their inner ends with the usual tack and driver receiving pockets as shown best in Fig. 16. The side tacker mechanisms are provided with an arrangement similar to that described for the toe tacker mechanism, comprising the tack driver rods 120, driver bar 122 and the transverse rod 124, as shown in Fig. 14. There are also provided adjusting screws by which the first and second side tackers may be spread from or toward the third one. It is preferred to space the fourth tacker a substantial distance back of the third tacker in each of the side tacker mechanisms, and when this is done there is provided, as shown in Fig. 14, a spring wiper plate 132 projecting in front of the tackers and adapted to lay the upper down smoothly between the third and fourth tackers. The described arrangement provides for lasting the shoe from a point on the rear part of the ball at one side of a woman's shoe at or near the front of the shank around the toe to a similarly located point on the rear part of the ball at the other side and securing the upper in lasted position by eleven tacks most advantageously distributed for holding the upper at the points where it is most likely to pull back. It will be noticed that the rear tacks, driven by the fourth tackers in the side tacking mechanisms, are additional to those of machines heretofore proposed. These tackers, as herein shown in coöperation with the wiper 132, last and fasten the upper far enough back on each side of the shoe to eliminate the necessity for further forepart lasting before a turn shoe is presented to the machine by which the upper is permanently secured to the sole.

In order that the toe gripper lever may carry the toe gripper to a position satisfactorily remote from the mechanisms which are to overlay and fasten the toe portion of the upper when the toe gripper is released, said lever is made in two sections pivoted together at 135, Fig. 1, and the tail piece of the front section has connection with a fixed strut 136 by means of a pin and oblique slot which accelerates and extends the lifting movement of the gripper carrying end of the lever when the jaws are released from the work. This is particularly important where a wide toe gripper is used which would otherwise occupy too broad a space near the shoe bottom to permit satisfactory operation of the overlaying and fastening means.

In the use of the machine a shoe, assembled as usual, is presented with the toe end of the last against the inner side of the inner jaw of the toe gripper and with the upper between the jaws of the toe gripper. The upper on the left side of the last is then inserted between the jaws of the left hand side gripper and those jaws may or may not then be closed as the operator may prefer by pressing the shoe bottom upwardly against the feeler 40. The upper is then arranged between the jaws of the right hand side gripper and those jaws are closed in the same way by pressure against the feeler 40. The operator may then, by pressure on the foot treadle connected with the side grippers, move those grippers together forwardly. The grippers will slip upon the stock and the operator may or may not seize the stock between his thumbs and forefingers in the rear of the grippers to hold it taut while they slide forwardly along it, it being understood that both of the operator's hands are now free for any use which he may desire to make of them inasmuch as the shoe is supported against the sole rest by the side grippers. As soon as either side gripper encounters the tip seam, it will move that end of the tip seam forwardly relatively to the other end of the tip seam until both grippers have engaged the tip seam and have thereby straightened it, that is, positioned the two ends of the tip seam in the same or other predetermined relative forward positions. The continued movement of the treadle may thereafter cause both side grippers to move both ends of the tip seam forwardly, thus foredrawing the upper, the amount of this foredrawing movement being determined by the relative adjustment of the plate 46 and the latch device 50. It will be noted that this foredrawing of the upper is effected before the power mechanism of the machine is started and prior to any updrawing, its purpose being to draft or to strain the upper forwardly around the heel portion of the last and to position it for the updrawing operation to take effect on it with the upper in its correct longitudinal relation to the last. As I am advised, this has not heretofore been provided for in pulling-over machinery.

It may be here stated that the described use of the foredrawing mechanism is optional with the workman and that, if he desires to do so, he may defer the foredrawing by means of the treadle connection with the side grippers until after the upper has been updrawn. The pin 52 limits the extent of the foredrawing, subject, of course, to the adjustment of the parts 46, 50, and the locking device 65 retains the grippers in their forward position until the usual side clamps have gripped the shoe whereupon the inward movement of the tacking mechanisms withdraws the locking device. If it be desired to set one side gripper, and the upper held by it, farther forward or farther back, that result can be accomplished by the manipulation of the hand wheel 56, thus enabling the operator to give to any particular shoe a desired angular relation of the tip seam to the last.

After the upper has been properly positioned upon the last for the updrawing operation to take place, the power mechanism is started by the use of the usual foot treadle whereupon the toe gripper is made to seize the upper and the side grippers to close tightly upon it and all of the grippers are uplifted to stretch the upper. It will be noted that the upper has been free in the toe gripper prior to the starting of the power mechanism and that the workman has opportunity immediately prior to starting the power mechanism to arrange the upper within the toe gripper so that it will pull smoothly. This is particularly important in a machine intended to prepare a shoe by pulling-over and lasting for immediate presentation to a sewing machine. The machine shown comes to rest with the upper held under tension by the grippers in order to permit inspection and such adjustment of the tension as the shoe may require. Upon the second treadling the power mechanism causes the side clamps to close and seize the shoe firmly and then the machine comes to rest. The operator thereupon arranges the toe wipers by advancing them and positioning them in the proper plane with relation to the shoe bottom and pressing them snugly against the upper around the end and corners of the toe. At the sides of the toe the upper is held smooth and free from wrinkles against the side of the last by the usual side clamps and the clamping fingers 105 which extend forwardly from the side clamps toward the corners of the toe for this purpose. The toe gripper may now be released from the upper whereupon it is automatically lifted out of the way of the wiper mechanism and the tacking mechanisms by the updrawn spring which was put under compression during the power operation. The operator may advantageously hold the wiper plates pressed firmly against the upper by retaining his thumb against the plate 94 while he treadles the machine again. Thereupon the toe tacker arm swings inwardly and forces the toe wipers over the shoe to wipe the upper into lasted position at the end and corners of the toe and the tackers insert three tacks for fastening the upper at these points. The side tackers also swing inwardly and abut against the side wiper plates 85 and force them over the shoe bottom to press the upper into position to be fastened by the tacks inserted by the side tacker mechanisms. The swinging tackers of the side tacker mechanism adjust themselves by means of their abutment pieces 98 so that each tacker shall insert its tack at the same distance as the others from the edge of the shoe bottom. The operator will have selected the proper right or left pair of wipers for use at the toe and the swinging tackers of the toe tacking mechanism will have adjusted themselves by engagement with the stops 112 for effecting the required right or left arrangement of toe corner tacks according to the requirements of the shoe. Upon the continued movement of the power mechanism after the tacks are driven, all of the parts are restored to their starting positions and the shoe is released with the upper pulled over, wiped into lasted position about the toe and along the sides, and fastened by lightly driven tacks which, in the case of a turn shoe, are located at such distances from the edge of the last as to enter the thick portion of the sole inside the leather. The shoe is then ready to be presented to the turn shoe sewing machine, although in some factories it is the custom to effect by hand or otherwise more or less lasting of the shank of the shoe preparatory to presentation to the sewing machine.

Having explained the nature of this invention and described a preferred construction embodying the same and how such construction may be used, I claim as new and desire to secure by Letters Patent of the United States protection for all of patentable novelty herein disclosed and intend that the following claims shall be construed to give effect to this purpose:—

1. A pulling-over machine having, in combination, toe and side grippers, means for operating them to pull an upper, means to overlay and fasten the pulled upper, means to release the grippers while the upper is under strain, and means to impart to the toe gripper so released a movement of retraction longer than that given to the side grippers to give place for the operation of the overlaying and fastening means.

2. A pulling-over machine having, in combination, toe and side grippers, means for operating them to pull an upper, means to overlay and fasten the pulled upper, said operating means for the toe gripper comprising a lever made in two sections pivoted together, a strut, and a connection from the strut to the rear arm of the front lever section, all arranged to accelerate the movement of the gripper carrying end of the lever.

3. A pulling-over machine having, in combination, last positioning means, side grippers, means for closing the grippers with a tension permitting them to slip on the upper, and means for adjusting the grippers on the upper while they are so closed.

4. A pulling-over machine having, in combination, last positioning means including means to restrain the last from forward movement, side grippers, means for closing the grippers with a tension permitting them to slip on the upper, and means for adjusting the grippers forwardly together on the upper while they are so closed.

5. A pulling-over machine having, in combination, a toe abutment for the last, side grippers, means for closing the side grippers with a tension permitting them to slip on the upper, and operating means for relatively moving the last and the two side grippers to transfer the gripping points toward the toe until the grippers engage the increased thickness of upper stock at the tip seam.

6. A pulling-over machine having, in combination, a toe abutment for the last, side grippers, means for closing the side grippers with a tension permitting them to slip on the upper, and means for moving opposite side grippers together along the upper toward the toe to cause them to abut against the increased thickness of the tip seam stock and straighten the tip seam.

7. A pulling-over machine having, in combination, a toe abutment for the last, side grippers, means for closing the side grippers with a tension permitting them to slip on the upper, means for moving the side grippers toward the toe, and gaging means limiting such movement, the grippers being adapted to slip along the upper until they engage the increased thickness of upper stock at the tip seam and then to move the tip seam for positioning it.

8. A pulling-over machine having, in combination, a toe abutment for the last, side grippers, means for closing the side grippers with a tension permitting them to slip on the upper, means for moving opposite side grippers together along the upper toward the toe, and abutments formed on the gripper jaws between the front and rear ends of the jaws for arresting slip of the grippers on the upper by engaging the increased thickness of stock at the tip seam.

9. A pulling-over machine having, in combination, a toe abutment for the last, side grippers, means for closing the side grippers with a tension permitting them to slip on the upper, means for moving opposite side grippers together along the upper toward the toe, abutments formed on the gripper jaws between the front and rear ends of the jaws for arresting slip of the grippers on the upper by engaging the increased thickness of stock at the tip seam, and means for thereafter further closing the jaws to grip the thick tip seam and the relatively thin stock back of the seam and pull the shoe upper.

10. A pulling-over machine having, in combination, toe grippers, side grippers, operating mechanism including means for initially closing the side grippers with a tension permitting them to slip on the upper and for subsequently further closing them, and means for moving the side grippers longitudinally of the shoe and relatively to the toe grippers after initial closing and while they can slip.

11. A pulling-over machine having, in combination, toe grippers, side grippers, operating mechanism including means for initially closing the side grippers with a tension permitting them to slip on the upper and for subsequently further closing them, means for moving the side grippers toward the toe grippers while they can slip, and gaging means to limit such movement.

12. A pulling-over machine having, in combination, toe grippers, side grippers, means constructed and arranged to move the tip seam of the upper into predetermined angular relation to the longitudinal axis of the last and then to advance the side grippers together toward the toe grippers, and an adjustable stop determining the extent of such advance movement for both side grippers.

13. A pulling-over machine having, in combination, toe grippers, side grippers, means for moving the side grippers together toward the toe grippers including a shaft connected with opposed side grippers, an actuating connection having a prescribed range of movement, and means for fixing the shaft and said connection in any one of a plurality of definite adjusted relations.

14. A pulling-over machine having, in combination, toe grippers, side grippers, means for moving the side grippers together toward the toe grippers including a shaft connected with opposed side grippers, an actuating plate 46, limiting means 52 therefor, and a lever 50 attached to the shaft and adapted for connection with the plate 46 at any one of a plurality of definite points for varying the points from and to which the grippers shall be moved.

15. A pulling-over machine having, in combination, side grippers and operating mechanism therefor including one means connected with both side grippers for first straightening the toe tip seam and then, by continued operation, moving the side grippers together lengthwise of the last.

16. A pulling-over machine having, in combination, side grippers and operating mechanism therefor including one means connected with both side grippers for moving them together lengthwise of the last and means for separately adjusting one of the side grippers lengthwise of the last relatively to the other side gripper, and locking means organized to hold the adjusted side gripper until the upper is released from the gripper and then to free the side gripper and return it to normal relation to the opposed side gripper.

17. A pulling-over machine having, in combination, side grippers and operating mechanism therefor including rack bars, connections therefrom to the side grippers arranged to allow vertical and horizontal inward and outward movements of the grippers relatively to the bars, a shaft, pinions on the shaft engaging the rack bars, and manually operated means to turn the shaft for moving the two side grippers together in the same direction forwardly or backwardly.

18. A pulling-over machine having, in combination, a shaft to be turned through a limited angle, a plate thereon having limiting stops extending radially from the shaft, a coöperating stop, a lever also on the shaft, said lever and plate being relatively movable about the axis of the shaft and one of them being fastened to the shaft whereby adjustment of the shaft may be effected, means for fixing the plate and the lever in different adjusted relations, and means operatively connected to the shaft through said plate and lever for turning the shaft through an angle determined by the limiting stops from and to points determined by the relative adjustment of the plate and lever.

19. A pulling-over machine having, in combination, side grippers, operating mechanism therefor including means for moving both side grippers forwardly, and means for automatically locking the side grippers in advanced position and for restoring them to retracted position after they have released the pulled upper.

20. A pulling-over machine having, in combination, opposed side grippers having relatively movable jaws, and operating mechanism including means for closing the jaws to an extent permitting them to slip on the upper, and means for moving the jaws forwardly along the upper, one jaw of each gripper being cut away from its front edge backwardly to provide a recess for the increased thickness of the upper stock at the tip seam and an abutment for engaging the edge of the tip seam.

21. A pulling-over machine having, in combination, a gripper and operating mechanism therefor including means arranged to be engaged by the shoe for closing the gripper and power mechanism for moving the gripper to pull the work.

22. A pulling-over machine having, in combination, a gripper and operating mechanism therefor including a closing spring, a second closing spring, manually operated means for controlling the action of the second spring to close the gripper initially, and power means for controlling the action of the first mentioned spring to close the gripper finally.

23. A pulling-over machine having, in combination, a gripper comprising jaws, means for closing the jaws, means for holding the closing means from acting, a tripper extending into position to be engaged by the shoe bottom and cause closing of the jaws when the upper is presented to the jaws, and other mechanism for moving the gripper bodily to pull the upper.

24. A pulling-over machine having, in combination, grippers and operating mechanism therefor including power mechanism to move the grippers to lay an upper over a last, said machine being constructed and arranged for permitting relative adjustment of the gripper jaws and the upper with relation to each other lengthwise of the edge of the upper after the upper is seized and prior to the overlaying movement of the grippers.

25. A pulling-over machine having, in combination, grippers and operating mechanism therefor including power mechanism to move the grippers to stretch and to overlay an upper upon its last bottom, said machine being constructed and arranged for permitting adjustment of the gripper jaws with relation to the upper along the edge of the upper after the jaws have gripped the upper and before the overlaying of the upper.

26. A pulling-over machine having, in combination, shoe positioning and holding means, side grippers, operating mechanism for the side grippers including means for moving said grippers to locate the toe tip seam, means for locking the grippers in position to hold the tip seam located, tacking mechanisms to fasten the upper in pulled over position, and operating mechanism therefor including means to release the side grippers from their locking means in time relation to the tacking operation.

27. A pulling over machine having, in combination, shoe positioning and holding means, side grippers, operating mechanism for the side grippers including means to advance the two side grippers together to straighten and locate the shoe tip seam, tacking mechanisms, means carried by a tacking mechanism to lock the side grippers with the tip seam located, and operating mechanism by which the tacking mechanisms are caused to withdraw the side gripper locking means from effective relation to the grippers and to insert tacks to fasten the upper in properly located and stretched relation to its last.

28. A pulling-over machine having, in combination, shoe positioning and holding means, toe and side grippers, wipers having toe plates to engage and wipe over the upper from the middle of the toe around each corner of the toe, side wiper plates pivoted to the toe plates and extending back along the portion of upper pulled by the side grippers, means to advance and close the toe wipers, and tackers normally located outside the shoe bottom and movable thereover into position to fasten the pulled and overwiped upper, said tackers and wipers being arranged for the tackers to actuate the wipers over the shoe bottom.

29. A pulling-over machine having, in combination, shoe positioning and holding means, toe and side grippers, fastening mechanism including side tackers movable over the shoe bottom to tacking position, and side wiper plates arranged to be positioned by the operator between the pulled upper and the side tackers to be actuated to do their work by the side tackers.

30. A pulling-over machine having, in combination, shoe positioning and holding means, toe and side grippers, fastening mechanism including side tackers movable over the shoe bottom to tacking position, and toe and side wiper plates arranged to be positioned around the toe and along the sides of the shoe with the side plates in position to be advanced over the shoe bottom by the incoming movement of the side tackers.

31. A pulling-over machine having, in combination, shoe positioning and holding means, toe and side grippers, tacking mechanisms movable from outside the shoe across the shoe edge to tack inserting position, and a wiper arranged to be positioned manually adjacent to the edge of the shoe where it will be actuated to do its work by an incoming tacking mechanism.

32. A pulling-over machine having, in combination, shoe positioning and holding means, toe and side grippers, tacking mechanisms movable from outside the shoe across the shoe edge to tack inserting position, and toe embracing wiper plates supported in the machine for manual arrangement relatively to the edge of the shoe in position to be actuated to overwipe the upper into lasted position by the incoming movement of a tacking mechanism to inserting position.

33. A pulling-over machine having, in combination, shoe positioning and holding means, toe and side grippers, tacking mechanisms movable from outside the shoe across the shoe edge to tack inserting position, and wiper mechanism including toe embracing plates and side plates arranged to be manually positioned relatively to the edge of the shoe with the side plates between the pulled upper and the side tacking mechanisms where said toe embracing and side plates will be actuated to do their work by the incoming movement of the tacking mechanisms.

34. A pulling-over machine having, in combination, shoe positioning and holding means, side grippers, operating mechanism for the side grippers, side clamps arranged to engage the stock pulled by the side grippers, auxiliary holders 105 extending forwardly from said clamps to clamp below the last bottom the upper in front of the side grippers, wiper mechanism to lay over the last bottom the upper so pulled and clamped, and mechanism to fasten the overlaid upper.

35. A pulling-over machine having, in combination, toe and side grippers to pull an upper, tackers to fasten the upper, and wiper mechanism to position the pulled upper for fastening, including toe embracing plates and side wiper plates pivotally connected to the toe plates and extending rearwardly therefrom along the sides of the shoe with capacity for limited independent movement.

36. A pulling-over machine having, in combination, toe and side grippers to pull an upper, means to fasten the upper, and wiper mechanism to position the pulled upper for fastening, including toe embracing plates pivotally connected together and each pivotally supported at a point laterally removed from the middle of the toe.

37. A pulling-over machine having, in combination, toe and side grippers to pull an upper, means to fasten the upper, and wiper mechanism to position the pulled upper for fastening, including toe embracing plates pivotally connected together and each pivotally supported at a point laterally removed from the middle of the toe, and yielding means holding the connected ends of said plates advanced and their free ends separated to cause the plates to engage the work first at the middle of the toe and later at the corners of the toe.

38. A pulling-over machine having, in combination, toe and side grippers to pull an upper, means to fasten the upper, and wiper mechanism to position the pulled upper for fastening, including toe embracing plates constructed and arranged to have an operative movement of those portions of their edges located at the middle of the toe in a direction away from the shoe while those portions of their edges at the corners of the toe are being moved inwardly and toward the end of the toe whereby some of the fullness at the corners of the toe between the end of the toe and the side grippers is worked toward the end of the toe before it is fastened.

39. A pulling-over machine having, in combination, toe and side grippers to pull an upper, means to fasten the upper, and wiper mechanism to position the pulled upper for fastening, including toe embracing plates constructed and arranged to have a positioning movement first against the end of the toe and then to back slightly away from the end of the toe while embracing the corners of the toe and finally to be closed over the end and corners of the toe, substantially as described.

40. A pulling-over machine having, in combination, toe and side grippers to pull an upper, means to fasten the upper, and a wiper mechanism to position the pulled upper for fastening, including wiper plates separately pivoted at opposite lateral sides of their meeting ends, means holding their outer ends separated, and positioning means arranged to take effect to move the outer ends inwardly and the meeting ends outwardly in response to pressure.

41. A pulling-over machine having, in combination, toe and side grippers to pull an upper, means to fasten the upper, and a wiper mechanism to position the pulled upper for fastening, including wiper plates separately pivoted at opposite lateral sides of their meeting ends, means holding their outer ends separated, positioning means arranged to close the outer ends of the plates to embrace the pulled upper, and operating means to cause the plates to wipe the upper over the shoe bottom and hold it for the fastening operation.

42. A pulling-over machine having, in combination, toe and side grippers to pull an upper, means to fasten the upper, and a wiper mechanism to position the pulled upper for fastening, including wiper plates operating to work the fullness of the fringe of the upper from the corners of the toe forwardly toward the end of the toe to distribute the fullness and hold it for the fastening operation.

43. A pulling-over machine having, in combination, toe and side grippers to pull an upper, means to fasten the upper, and a wiper mechanism to position the pulled upper for fastening, including wiper plates separately pivoted at opposite lateral sides of their meeting ends, means holding their outer ends separated yieldingly, pins depending from said plates outside the pivots, and positioning means engaging said pins to turn the plates on their separate pivots.

44. A pulling-over machine having, in combination, toe and side grippers to pull an upper, tackers to fasten the upper, and a wiper mechanism to position the pulled upper for fastening, including wiper plates separately pivoted at opposite lateral sides of their meeting ends, means holding their outer ends separated, a carrier for the plate pivots, positioning means to turn the plates and cause them to embrace the pulled upper, and separate operating means for advancing the carrier.

45. A pulling-over machine having, in combination, toe and side grippers to pull an upper, tackers to fasten the upper, and a wiper mechanism to position the pulled upper for fastening, including wiper plates, a carrier upon which the plates are movable, positioning means for moving the plates relatively to the carrier into embracing relation to the pulled upper, and operating means connected with the tackers to advance the plates for overlaying and holding the upper while the tacks are driven.

46. A pulling-over machine having, in combination, upper pulling grippers, upper securing means, toe embracing wipers mounted to be manually positioned in toe embracing relation to the pulled upper, and power mechanism for operating said wipers to lay the upper into position to be secured and for operating the securing means to fasten the upper.

47. A pulling-over machine having, in combination, means to pull over a shoe, lasting means comprising toe embracing plates adapted to close over the toe of a shoe and mounted for manual adjustment into toe embracing position and into operative relation to the plane of the bottom of the toe portion of the shoe after the upper has been pulled, and power mechanism to operate the plates to lay the upper into lasted position and hold it for a fastening operation on the upper.

48. A pulling-over machine having, in combination, means to pull over a shoe, lasting means comprising toe embracing plates adapted to close over the toe of a shoe and mounted for manual adjustment into toe embracing position and into operative relation to the plane of the bottom of the toe portion of the shoe after the upper has been pulled, power mechanism to operate the plates to lay the upper into lasted position, and securing mechanism arranged to operate automatically to fasten the upper while the plates hold it.

49. A pulling-over machine having, in combination, lasting means comprising right and left pairs of toe embracing plates supported for alternative use, and multiple tack securing mechanism arranged for automatic adjustment by said lasting means to effect right and left tacking.

50. A pulling-over machine having, in combination, lasting means comprising two pairs of toe embracing plates supported for alternative use, and multiple tacking mechanism constructed and arranged to be controlled as to the arrangement of tacks according to the lasting means which is in use.

51. A pulling-over machine having, in combination, lasting means comprising right and left pairs of toe embracing plates, a support for said plates movable to present either pair for use alternatively, securing mechanism comprising a plurality of relatively movable tackers, and coöperating positioning devices associated with the toe embacing plates and with the relatively movable tackers to control the positions at which tacks are inserted in accordance with the plates that are in use.

52. A pulling-over machine having, in combination, means to pull over a shoe, and lasting means comprising right and left pairs of toe embracing plates supported for alternative use upon shoes pulled over by the same pulling-over means.

53. A pulling-over machine having, in combination, means to pull over a shoe, lasting means comprising right and left pairs of toe embracing plates, a support for said plates movable to present either pair for use alternatively upon shoes pulled over by the same pulling-over means, and operating means adapted to coöperate with whichever pair of plates occupy operative relation to the pulling-over means.

54. A pulling-over machine having, in combination, means to pull over a shoe, lasting means comprising right and left pairs of toe embracing plates, a support for said plates movable to present either pair for use alternatively upon shoes pulled over by the same pulling-over means, and an upper securing mechanism adapted to coöperate with whichever pair of plates occupy operative relation to the pulling-over means.

55. A pulling-over machine having, in combination, pulling-over means adapted to operate upon right and left shoes, lasting means comprising pairs of right and left toe embracing plates, a tacking mechanism movable over the shoe bottom, a support for the toe embracing plates mounted on the tacking mechanism for turning movement to present either the right or the left plates in coöperative relation to the pulling-over means and having a limited movement lengthwise on the tacking mechanism to enable it to be positioned adjacent to the shoe prior to the actuation of the tacking mechanism, and coöperating stops on the lasting mechanism and the tacking mechanism wherethrough the latter actuates the toe embracing plates over the shoe bottom.

56. A pulling-over machine having, in combination, pulling-over means, upper tacking mechanisms including tackers having abutment pieces for determining how far the tackers shall advance over the shoe edge, and narrow wipers suitably proportioned to be located between said abutment pieces and the tacking points in position to be actuated by the abutment pieces for laying and holding the upper for the action of the tackers.

57. A pulling-over machine having, in combination, means for pulling an upper at different points, means for laying the pulled upper over a sole on the last bottom, means for securing the overlaid upper to the sole, the combination being adapted for working on uppers the foreparts of which are placed loosely over the last whereby the uppers are pulled over the last and secured at different points in position for lasting, and means for stretching the sides of the uppers forwardly while loose on the last.

58. A pulling-over machine, having, in combination, means for pulling an upper at different points, means for laying the pulled upper over a sole on the last bottom, means for securing the overlaid upper to the sole, and means to straighten the tip seam into predetermined angular relation to the last and then to pull the upper at the sides of the last forwardly to tighten it along the sides of the last.

59. A pulling-over machine having, in combination, means for pulling an upper at different points, means for laying the pulled upper over a sole on the last bottom, means for securing the overlaid upper to the sole, and a treadle connection with the pulling-over means adapted to arrange the upper with the tip seam in predetermined angular relation to the longitudinal axis of the last and then to draw the upper forwardly at the sides of the last before it is pulled over.

60. A pulling-over machine having, in combination, means for pulling an upper at different points, means for laying the pulled upper over a sole on the last bottom, means for securing the overlaid upper to the sole, the combination being adapted for working on uppers the foreparts of which are placed loosely over the last whereby the uppers are pulled over the last and secured at different points in position for lasting, and means arranged for operation to straighten the toe tip seam of the upper before the upper is pulled.

61. A pulling-over machine having, in combination, means for pulling an upper at different points, means for laying the pulled upper over a sole on the last bottom, means for securing the overlaid upper to the sole, the combination being adapted for working on uppers the foreparts of which are placed loosely over the last whereby the uppers are pulled over the last and secured at different points in position for lasting, and means for straightening the toe tip seam of the upper while the upper is loose on the last and adapted for tightening the upper forwardly along the sides of the last before it is pulled over.

62. A pulling-over machine having, in combination, means for pulling an upper at different points, means for laying the pulled upper over a sole on the last bottom, means for securing the overlaid upper to the sole, the combination being adapted for working on uppers the foreparts of which are placed loosely over the last whereby the uppers are pulled over the last and secured at different points in position for lasting, and means adapted for moving each end of the toe tip seam forwardly to predetermined relation to the toe end of the last before the upper is pulled over.

63. A pulling-over machine having, in combination, means for pulling an upper at different points, means for laying the pulled upper over a sole on the last bottom, means for securing the overlaid upper to the sole, the combination being adapted for working on uppers the foreparts of which are placed loosely over the last whereby the uppers are pulled over the last and secured at different points in position for lasting, and one operating means adapted for serving the double purpose of straightening the toe tip seam and then tightening the upper forwardly on both sides of the last at the same time.

64. A pulling-over machine having, in combination, last positioning means, side grippers, means for closing the grippers with a tension permitting them to slip on the upper, means for further closing the grippers and moving them to pull the upper, and means for moving the grippers forwardly adapted for use while the grippers are lightly closed to adjust the grippers along the upper or, alternatively, for use after the grippers are finally closed to adjust the pulled upper forwardly.

65. A pulling-over machine having, in combination, a toe abutment for the last, side grippers, securing mechanism, power operating mechanism for causing the grippers to overlay the upper and the securing mechanism to fasten it, means separate from the power mechanism for closing the grippers, and means for moving the side grippers together forwardly of the last arranged to permit it to be used before the power mechanism is started.

66. A pulling-over machine having, in combination, a toe abutment for the last, side grippers, means for causing the side grippers to seize the upper without stretching it transversely of the last, and means for moving the grippers forwardly together while the upper is so gripped without being stretched transversely of the last.

67. A pulling-over machine having, in combination, a gripper, means to operate it to pull an upper, and means to close the gripper automatically as an incident to the presentation of the shoe to the gripper.

68. A pulling-over machine having, in combination, a gripper, means to operate it to pull an upper, means tending to close the jaws of the gripper, means for retaining said jaws in open position, and means located adjacent to the jaws of the gripper in position to be moved for releasing the jaws from said retaining means while the shoe is being presented to the gripper.

69. A pulling-over machine having, in combination, a gripper, means to operate it to pull an upper, and means located to be engaged and moved by the shoe to cause closing of the jaws when the upper is in position to be gripped.

70. A pulling-over machine having, in combination, a gripper, means to operate it to pull an upper, and means including a closing spring and a tripper for the spring arranged adjacent to the shoe and in position to be moved to cause the spring to act when the shoe stock is properly located within the gripper jaws.

71. A pulling-over machine having, in combination, a gripper, means to operate it to pull an upper, and means including a closing spring and a tripper for the spring arranged to be pushed up to release the spring by engagement of the shoe bottom therewith when the upper has been inserted between the jaws of the gripper.

72. A pulling-over machine having, in combination, a gripper, means to operate it to pull an upper, and means to close the gripper including two springs one of which is responsive to manual control and the other of which is responsive to the control of the said operating means.

73. A pulling-over and lasting machine having, in combination, pulling-over means, tacking mechanisms including a toe tacking mechanism, and lasting means comprising right and left pairs of toe embracing plates supported on the toe tacking mechanism for alternative use in effecting right and left lasting in coöperation with the same tacking mechanism.

74. A pulling-over and lasting machine having, in combination, right and left pairs of toe embracing plates mounted for movement to bring either pair alternatively into operative position, and one operating means relative to which said movement takes place and which is adapted to effect closing movement of either pair of plates presented in operative position.

75. A pulling-over machine having, in combination, side grippers, means for closing them, and means for advancing them toward the toe of the shoe, said grippers comprising jaws having on their gripping faces ribs which are inclined upwardly and backwardly.

76. A pulling-over machine having, in combination, side grippers, means for closing them with a tension permitting them to slip on the upper, and means for moving them forwardly on the upper, said grippers comprising jaws having face formations which tend to draw the stock into the jaws as the grippers slip along the upper during their forward movement.

77. A pulling-over machine having, in combination, toe and side grippers, a sole rest operating to determine the plane of the shoe bottom, mechanisms for overlaying and fastening the upper, and operating means for the grippers including means to lift the toe grippers to a position higher above the plane of the shoe bottom than the side gripper jaws while the overlaying and fastening mechanisms are operating.

78. A pulling-over and lasting machine having, in combination, side grippers, toe grippers having wide jaws to engage substantially the entire width of the forward portion of the upper, toe lasting mechanism for laying said forward portion of the upper over upon the shoe bottom, side tacking mechanism to fasten the upper pulled by the side grippers, and operating means for the grippers including means to raise the toe grippers above the side grippers for the operation of the lasting and fastening mechanisms.

79. A pulling-over machine having, in combination, toe and side grippers, mechanisms for overlaying and fastening the upper, and operating means for the grippers including an updraw lever for the toe gripper formed in two relatively movable sections pivoted together in front of the fulcrum, a fixed strut, and a pin and oblique slot connection between the tail piece of the front section and said strut arranged to extend the lifting movement of the gripper carrying end of the lever to withdraw the toe gripper from the field of operation of the overlaying and fastening mechanisms.

80. A pulling-over machine having, in combination, toe and side grippers, mechanisms for overlaying and fastening the upper, and operating means for the grippers including updraw levers for the side grippers, yielding connections through which said levers are operated, a rock-shaft, connections from the rear ends of the levers to said rock-shaft, and a dash pot and connections from the rock-shaft to the dash pot substantially as described for delaying the transmission of movement to the levers through said yielding connections.

81. A pulling-over machine having, in combination, toe and side grippers, mechanisms for overlaying and fastening the upper, and operating means for the grippers including updraw levers for the side grippers, yielding connections through which said levers are operated, a rock-shaft, connections from the rear ends of the levers to said rockshaft, a hand lever 16 extending from said rockshaft, a fixed ratchet, and a pawl carried by the lever, whereby the updraw levers may be raised or lowered by force applied to their rear ends.

82. A pulling-over and lasting machine having, in combination, pulling-over means, toe lasting means comprising toe embracing wipers that are replaceable for toes of different shapes, and toe tacking mechanism comprising a plurality of tackers which are relatively adjustable to coöperate with different wipers in working upon toes of varying shapes.

83. A pulling-over and lasting machine having, in combination, pulling-over means, toe lasting means comprising toe embracing wipers that are replaceable for toes of different shapes, and toe tacking mechanism comprising a plurality of tackers which are relatively adjustable lengthwise of the shoe for securing the upper on unsymmetrical shapes of toes.

84. A pulling-over and lasting machine having, in combination, pulling-over means, toe lasting means comprising toe embracing wipers that are replaceable for toes of different shapes, and toe tacking mechanism comprising a plurality of tackers which are relatively adjustable transversely of the shoe for the purpose described.

85. A pulling-over and lasting machine having, in combination, pulling-over means, toe lasting means, and toe tacking mechanism comprising a plurality of tackers which are relatively adjustable to insert tacks spaced apart different distances and in variable relations to the edge of the shoe bottom.

86. A pulling-over and lasting machine having, in combination, pulling-over means, toe lasting means, and tacking mechanism comprising a plurality of tackers relatively adjustable laterally, substantially as described.

87. A pulling-over and lasting machine having, in combination, pulling-over means, toe lasting means, and tacking mechanisms each comprising a plurality of tackers, one of which is relatively fixed and the others of which are mounted to yield backwardly relatively to the fixed tacker according to the edge contour of the shoe bottom.

88. A machine for working an upper over a last having, in combination, toe embracing wipers, an extension wiper member pivoted to the outer end portion of each wiper, and means operating automatically during use of the machine to swing the extension wiper members inwardly.

89. A machine for working an upper over a last having, in combination, toe embracing wipers, and an extension member freely pivoted on the outer end portion of each wiper and adapted to be swung into a position in which its acting edge presents a substantially uninterrupted continuation of the acting edge of the wiper to which it is pivoted.

90. A machine for working an upper over a last having, in combination, toe embracing wipers comprising two members separately pivoted on axes laterally spaced apart, a pin and slot connection between the members, springs connected with said members at the outer sides of the pivots and operating to hold the wipers open, and means for limiting the opening of the wipers.

91. A machine for working an upper over a last having, in combination, toe embracing wipers comprising two members separately pivoted on axes laterally spaced apart, said members having portions between their pivots constructed to present wiping edges extending continuously along the edge of the shoe at the toe and having substantially the contour of the toe end of the shoe, and means for operating said wipers.

92. A machine for working an upper over a last having, in combination, toe embracing wipers comprising two members separately pivoted on axes laterally spaced apart, and a in and slot connection between the members.

93. A machine of the class described having, in combination, grippers for pulling an upper at opposite sides of a last, one of said grippers being adjustable lengthwise of the last without affecting the position of the gripper at the other side of the last, and means for locking said adjustable gripper to hold it in its adjusted relation to the other gripper while the upper is under tension.

94. A machine of the class described having, in combination, grippers for pulling an upper at opposite sides of a last, one of said grippers being adjustable lengthwise of the last without affecting the position of the gripper at the other side of the last, means for retaining said adjustable gripper in its adjusted relation to the other gripper, and means for operating said retaining means to effect the release of said gripper and permit it to return into normal relation to the other gripper.

95. A pulling-over and lasting machine having, in combination with operating means, shoe positioning and holding means, toe and side grippers, means to work the upper of the shoe over the toe of a last into position to be fastened, and power operated means constructed and arranged to work the upper over the last along each side of the ball from the toe to points at or near the beginning of the shank and secure it by fastenings including tacks located at or near the rear end of the ball of the last on each side of the shoe.

96. A pulling-over machine having, in combination, shoe positioning and holding means, toe and side grippers, toe tacking mechanism, toe embracing wipers supported for manual adjustment into position to be operated by movement of the tacking mechanism to lay the upper over the margin of the last bottom in lasted position, and mechanism constructed and arranged to force the upper into lasted position along each side of the shoe from said toe wipers to the rear end of the ball of the shoe and secure the upper in position ready for presentation to a machine for sewing the upper to the sole.

97. In a machine of the class described, wiper mechanism comprising toe embracing plates arranged to extend continuously around the toe of a shoe and pivotally supported at points laterally removed from the middle of the toe, and yielding means for holding the inner ends of the plates normally advanced and their outer ends separated to cause the plates to engage the work first at the middle of the toe and later at the corners of the toe.

98. In a machine of the class described, wiper mechanism comprising toe embracing plates, means for supporting said plates for operative movement to cause those portions of their edges which are located at the middle of the toe to recede from the shoe while the portions of their edges at the corners of the toe are moving inwardly toward the end of the toe, to work some of the fullness at the corners toward the end of the toe, and means for operating said wiper mechanism.

99. In a machine of the class described, wiper mechanism comprising toe embracing plates, means for supporting said plates for initial positioning engagement with the end of the toe and for subsequent movement backward from the end of the toe while embracing the corners of the toe, and means for imparting to said plates a final movement over both the end and the corners of the toe.

100. In a machine of the class described, wiper mechanism comprising toe embracing plates separately pivoted at opposite lateral sides of their meeting ends, means tending to separate the outer ends of said plates, and means responsive to pressure for moving the outer ends of the plates inwardly and the meeting ends outwardly to position the plates with relation to the shoe.

101. In a machine of the class described, the combination with toe lasting mechanism, of a plurality of toe tackers relatively movable transversely of the shoe edge in a direction lengthwise of the shoe, and means on said lasting mechanism for determining the relative positions of said tackers for the tack driving operation.

102. In a machine of the class described, the combination with toe lasting mechanism, of a plurality of toe tackers relatively movable transversely of the shoe edge, and stops on said lasting mechanism for engaging the tackers to determine the relative positions of said tackers for the tack driving operation, said stops being adjustable to permit the tacks to be driven at different distances from the edge of a shoe.

103. In a machine of the class described, the combination with toe lasting mechanism, of a toe tacker arm, a plurality of tackers carried by said arm, one of the tackers being mounted for movement relatively to the arm transversely of the shoe edge, means for limiting the movement of the arm in the direction to carry the tackers over the shoe bottom, and means on the lasting mechanism for engaging said relatively movable tacker to limit the movement of said tacker over the shoe.

104. In a pulling-over machine, the combination with a toe gripper, of operating means for said gripper comprising a main updraw lever, a supplemental lever pivoted between its ends to said main lever, means connecting the gripper to the front arm of said supplemental lever, and an abutment for engaging the rear arm of the supplemental lever to cause a relative increase in the extent of the toe gripper movement.

105. A pulling-over machine having, in combination, grippers for pulling an upper respectively at opposite sides of a last, means for positioning said grippers in a normal relation to each other lengthwise of the last while permitting relative adjusting movement of said grippers lengthwise of the last, means for retaining the grippers in adjusted relation, and means for causing said retaining means to release the grippers and permit them to resume their normal relation to each other.

106. A pulling-over machine having, in combination, grippers for pulling an upper respectively at opposite sides of a last, yielding means tending to position said grippers in a normal relation to each other lengthwise of the last while permitting relative adjustment of said grippers lengthwise of the last, and means for retaining said grippers in adjusted relation while the upper is under tension, said retaining means being constructed to permit the grippers to resume their normal relation to each other under the influence of said positioning means when the upper is released.

107. A pulling-over machine having, in combination, grippers for pulling an upper respectively at opposite sides of a last, one of said grippers being adjustable independently of the other gripper lengthwise of the last, means for positioning said adjustable gripper in a normal relation to the other gripper lengthwise of the last while permitting said adjustment, means for retaining the adjustable gripper in adjusted position, and power operated means for causing said retaining means to release said gripper and permit it to resume its normal relation to the other gripper.

108. In a pulling-over machine, a side gripper adjustable in a direction lengthwise of a last, yielding means for determining a normal position of said gripper lengthwise of the last while permitting said adjustment, means for retaining the gripper in adjusted position, and means for causing said retaining means to release the gripper.

109. A pulling-over machine having, in combination, side grippers movable to pull an upper over a last and movable also lengthwise of the last, and operating means for moving said grippers together toward the toe end of the last while in engagement with the upper, said operating means being constructed to permit the gripper at one side of the last to be moved also lengthwise of the last independently of the gripper at the other side of the last.

110. A pulling-over machine having, in combination, opposite side grippers movable to pull an upper over a last and movable also lengthwise of the last, means for normally positioning said grippers in definite relative locations lengthwise of the last, and operating means for moving the grippers together toward the toe end of the last without affecting their relative positions, said positioning and operating means being constructed to permit one of the grippers to be adjusted independently of the other lengthwise of the last.

111. A pulling-over machine having, in combination, grippers for pulling an upper respectively at opposite sides of a last, means for moving said grippers lengthwise of the last toward the toe end of the last, means for determining different limits for said movement of the grippers, and means operative for any limit of the movement of the grippers for locking them against retraction.

112. A pulling-over machine having, in combination, grippers for pulling an upper respectively at opposite sides of a last, means for moving said grippers in one direction lengthwise of the last, means for locking said grippers against movement in the opposite direction, and power operated means for causing said locking means to release the grippers.

113. A pulling-over machine having, in combination, grippers for engaging an upper respectively at opposite sides of a last, and means for moving said grippers together lengthwise of the last, said means comprising parts relatively adjustable to determine different limits of movement for said grippers.

114. A pulling-over machine having, in combination, grippers for engaging an upper respectively at opposite sides of a last, operating means for moving said grippers together lengthwise of the last, and a stop for limiting the movement of said means, said operating means comprising parts relatively adjustable to determine different limits of movement for said grippers relatively to the limit of movement of said means.

115. A pulling-over machine having, in combination, grippers for engaging an upper respectively at opposite sides of a last, and means for moving said grippers together in the same direction lengthwise of the last comprising rack bars connected to the grippers and pinions for operating said bars, said pinions being relatively adjustable to determine different relative locations of the grippers.

116. A pulling-over machine having, in combination, grippers for engaging an upper respectively at opposite sides of a last, means for moving said grippers together in the same direction lengthwise of the last comprising rack bars connected to the grippers and pinions for operating said bars, means for moving one of the pinions relatively to the other to effect a relative adjustment of the grippers, and means for locking said adjustable pinion in adjusted position.

117. A pulling-over machine having, in combination, grippers for pulling an upper respectively at opposite sides of a last, means for moving said grippers together lengthwise of the last in the direction of the toe end of the last, means for overlaying and fastening the upper, and means controlled by said overlaying and fastening means for locking the grippers in their foremost position and for subsequently releasing them to permit them to be retracted.

118. A pulling-over machine having, in combination, grippers for pulling an upper respectively at opposite sides of a last, operating means for moving said grippers together lengthwise of the last in the direction of the toe end of the last, means for overlaying and fastening the upper comprising a side tacker arm movable toward and from the shoe, and means on said arm arranged to engage said operating means to retain the grippers in their foremost position and to release said operating means when said arm moves toward the shoe.

119. In a pulling-over machine, a gripper comprising relatively movable jaws, means for operating said gripper to pull the work, means for closing said jaws independently of the gripper operating means, and manual means for rendering said jaw closing means operative.

120. In a pulling-over machine, a gripper comprising relatively movable jaws, means for operating said gripper to pull the work, means for closing said jaws without pulling the work while said operating means remains at rest, and manual means for rendering said closing means operative.

121. In a pulling-over machine, a gripper comprising relatively movable jaws, means for operating said gripper to pull the work, spring means arranged for closing said jaws without pulling the work while said operating means is at rest, and a latch arranged to retain said spring means in jaw releasing position and to be tripped to cause the jaws to close on the work prior to the operation of the gripper operating means.

122. In a pulling-over machine, a gripper comprising relatively movable jaws, a gripper casing on which said jaws are mounted, a jaw closing slide, spring means tending to move said slide in a direction to close the jaws, and a latch at the side of the gripper casing arranged to hold the slide in position to release the jaws and to be tripped by the operator for causing the jaws to be closed.

123. In a pulling-over machine, a gripper comprising relatively movable jaws, a gripper bar, a closing slide movable relatively to said bar in a direction to close the jaws, spring means tending to move the slide in said direction, and a connection between said slide and bar arranged to be tripped to render said spring effective to close the jaws and to be reëngaged to transmit movement from the bar to the jaws in the pulling operation.

124. In a pulling-over machine, a gripper comprising relatively movable jaws, a gripper bar, a closing slide movable relatively to said bar in a direction to close the jaws, spring means tending to move the slide in said direction, and a latch device arranged to connect said slide and bar to transmit movement from the bar to the jaws in the pulling operation, said device being arranged to be tripped manually to cause the jaws to close initially on the stock and to be reëngaged in the pulling operation in condition to be tripped again to break the connection between the bar and the slide for causing the jaws to release the stock.

125. A machine of the class described having, in combination, shoe positioning means, side fastening instrumentalities, and end lasting wipers arranged to extend along the sides of the shoe and to be positively operated by movement of said instrumentalities toward the shoe to work the upper into finally lasted position.

126. A machine of the class described having, in combination, shoe positioning means, side tacker arms movable inwardly toward the sides of the shoe, and end lasting wipers supported at the toe end of the shoe independently of said arms and arranged to extend along the sides of the shoe in position to be closed over the shoe bottom by the inward movement of said arms.

127. A machine of the class described having, in combination, upper pulling means, end lasting wipers, means for moving said wipers lengthwise of the shoe to cause them to assume control of the tensioned upper and wipe it over the end of the toe, and means movable inwardly toward the shoe from opposite sides for engaging said wipers to close them over the shoe.

128. A machine of the class described having, in combination, shoe positioning means, upper fastening means movable inwardly toward the shoe from opposite sides, end lasting wipers, and means for moving said wipers lengthwise of the shoe, said wipers being extended between said fastening means and the shoe to cause them to be closed over the shoe by the inward movement of the fastening means.

129. A pulling-over and lasting machine having, in combination, pulling-over means, and lasting means comprising different wipers supported for alternative use upon shoes pulled over by the same pulling over means.

130. A machine of the class described having, in combination, shoe positioning means, lasting means comprising different wipers, a support for said wipers mounted for movement to permit the different wipers to be positioned alternatively for operation upon the work, and a single operating means in operative relation to which the different wipers are positioned selectively.

131. In a machine of the class described, the combination with lasting mechanism, of a plurality of tackers for fastening the upper in lasted position, said tackers being relatively movable transversely of the edge of the shoe, and the lasting mechanism having means for engaging said tackers to determine their relative positions.

132. In a machine of the class described, the combination with lasting mechanism, of a plurality of tackers for fastening the upper in lasted position, said tackers being relatively movable transversely of the edge of the shoe, and means on said lasting mechanism and tackers arranged for coöperative engagement to determine the relative positions of the different tackers, said means being adjustable to vary said positions.

133. In a machine of the class described, the combination with pulling-over means, of side clamps arranged to engage the pulled upper at opposite sides of the last, and auxiliary clamps arranged to engage the upper in front of said side clamps and each comprising a pair of upper engaging members and an equalizing connection between said members to cause them to press uniformly upon the upper.

134. In a machine of the class described, the combination with pulling-over means, of side clamps arranged to engage the pulled upper at opposite sides of the last, and auxiliary clamps arranged to engage the upper in front of said side clamps, said auxiliary clamps each comprising a pair of upper engaging members, a spring for pressing said members against the upper, and equalizing means between said members to cause them to press uniformly upon the upper.

135. In a machine of the class described, a side clamp comprising members arranged to engage the upper at the side of the last in different locations lengthwise of the last, a spring for pressing said members against the upper, and an equalizing connection between said members to cause the members to press uniformly upon the upper.

136. In a machine of the class described, the combination with means for working an upper over a last, of a plurality of adjacent tackers for fastening the upper on the bottom of the last, said tackers being relatively adjustable to space the tacks different distances apart lengthwise of the edge of the last.

137. In a machine of the class described, the combination with means for working an upper over a last, of a plurality of adjacent tackers for fastening the upper on the bottom of the last, spring means tending to move said tackers relatively toward one another lengthwise of the edge of the last, and means for effecting relative adjustment of the tackers in opposition to said spring means.

138. In a machine of the class described, the combination with means for working an upper over a last, of a plurality of adjacent tackers, and an adjusting screw threaded in one of said tackers and engaging another tacker to vary the spacing of the tackers lengthwise of the edge of the last.

In testimony whereof I have signed my name to this specification in the presence of two subscribing witnesses.

ORRELL ASHTON.

Witnesses:
  ARTHUR L. RUSSELL,
  HARLOW M. DAVIS.